United States Patent
Matus et al.

(10) Patent No.: US 12,489,303 B2
(45) Date of Patent: Dec. 2, 2025

(54) CDOT DEVICE FOR WIRELESS CHARGING

(71) Applicant: Littelfuse, Inc., Chicago, IL (US)

(72) Inventors: Yuriy Borisovich Matus, Pleasanton, CA (US); Martin G. Pineda, Fremont, CA (US)

(73) Assignee: Littelfuse, Inc., Rosemont, IL (US)

( * ) Notice: Subject to any disclaimer, the term of this patent is extended or adjusted under 35 U.S.C. 154(b) by 565 days.

(21) Appl. No.: 17/986,083

(22) Filed: Nov. 14, 2022

(65) Prior Publication Data

US 2024/0162728 A1   May 16, 2024

Related U.S. Application Data

(60) Provisional application No. 63/281,871, filed on Nov. 22, 2021.

(51) Int. Cl.
| | |
|---|---|
| H01M 10/46 | (2006.01) |
| H01M 10/42 | (2006.01) |
| H01M 10/44 | (2006.01) |
| H02J 7/00 | (2006.01) |
| H02J 50/10 | (2016.01) |

(52) U.S. Cl.
CPC ....... *H02J 7/00309* (2020.01); *H01M 10/425* (2013.01); *H01M 10/44* (2013.01); *H02J 7/007* (2013.01); *H02J 50/10* (2016.02); *H01M 2010/4271* (2013.01); *H01M 2220/30* (2013.01)

(58) Field of Classification Search
CPC .. H02J 7/007192; H02J 7/007; H02J 7/00309; H02J 50/10; H02J 50/005; H01M 10/44; H01M 2220/30; H01M 2010/4271
USPC ................. 320/107, 108, 114, 115, 150, 153
See application file for complete search history.

(56) References Cited

U.S. PATENT DOCUMENTS

| | | | |
|---|---|---|---|
| 2013/0070381 A1 | 3/2013 | Sha | |
| 2019/0027796 A1 | 1/2019 | Matus | |
| 2021/0251109 A1* | 8/2021 | Wippler | H02J 7/02 |
| 2022/0103002 A1* | 3/2022 | Marz | H02J 7/0049 |

FOREIGN PATENT DOCUMENTS

| | | |
|---|---|---|
| EP | 3904849 A1 | 11/2021 |
| WO | 2017061192 A1 | 4/2017 |

OTHER PUBLICATIONS

Machine translation WO2017061192A1 (Apr. 13, 2017) (Year: 2017).*
European Search Report and Written Opinion for the European Application No. EP22208528, mailed Apr. 6, 2023, 6 pages.

* cited by examiner

*Primary Examiner* — Edward Tso
(74) *Attorney, Agent, or Firm* — KDW Firm PLLC

(57) ABSTRACT

A battery protection device includes a Charge/Discharge Over Temperature (CDOT) device and a wireless charging coil. The CDOT device consists of a first electrode, a second electrode, and a variable resistance material. The first electrode is located on a substrate and has a first collection of fingers. The second electrode is located on the substrate and has a second collection of fingers. The first fingers and the second fingers are disposed in an interdigitated, spaced-apart relationship with one another, resulting in a gap between them that is serpentine and tortuous. The variable resistance material changes its resistance in response to a change in temperature.

8 Claims, 12 Drawing Sheets

CDOT DEVICE FOR WIRELESS CHARGING

CROSS-REFERENCE TO RELATED APPLICATIONS

This application is a continuation of, and claims the benefit of priority to, U.S. Provisional Patent Application No. 63/281,871, filed on Nov. 22, 2021, entitled "CDOT Device for Wireless Charging", which is incorporated by reference herein in its entirety.

FIELD OF THE DISCLOSURE

Embodiments of the present disclosure relate to wireless charging and, more particularly, to mechanisms to thermally manage a battery during wireless charging.

BACKGROUND

Mobile devices, such as smartphones and laptop computers, utilize batteries to enable the device to be operable without being plugged into a power source. Many smartphones, for example, include rechargeable batteries, such as lithium-ion batteries. Over time and use, the lithium-ion batteries lose their charge, resulting in loss of function of the smartphone. By plugging the smartphone into the power source, the lithium-ion batteries may be recharged, enabling the smartphone to once again be mobile.

Some batteries can be charged using wireless charging. As one example, a type of induction charging known as the Qi wireless standard allows the battery to be charged in the presence of a magnetic field. The charging device includes an induction coil and the mobile device include a second induction coil. Together, the coils create a magnetic field that sends electric current to charge the battery.

In simplest terms, the battery is designed such that electrons flow between its terminals, supplying current to the mobile device. Batteries operates within a relatively narrow temperature range. If the temperature of the battery goes outside the temperature range, thermal runaway can occur. Thermal runaway is a chemical reaction within the battery cell that produces heat, which can cause the battery cell temperature to rise incredibly fast (within milliseconds). Thermal runaway can thus cause the battery to melt, explode, and even start fires.

While poor battery maintenance such as physical damage, excess heat, or excess cold can be the culprit, thermal runaway can also be caused by charging events, such as overcharging or rapid charging. In the case of wireless charging, the magnetic field produced by the induction coils may generate excess heat, resulting in thermal runaway. Ultimately, these events can damage the components of the battery and limit its life and may even damage the mobile device housing the battery.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a battery protection device in accordance with the present disclosure may include a Charge/Discharge Over Temperature (CDOT) device and a wireless charging coil. The CDOT device consists of a first electrode, a second electrode, and a variable resistance material. The first electrode is located on a substrate and has a first collection of fingers. The second electrode is located on the substrate and has a second collection of fingers. The first fingers and the second fingers are disposed in an interdigitated, spaced-apart relationship with one another, resulting in a gap between them that is serpentine and tortuous. The variable resistance material changes its resistance in response to a change in temperature. The wireless charging coil is connected to the CDOT device.

An exemplary embodiment of mobile device in accordance with the present disclosure may include a rechargeable battery, a CDOT device, and a wireless charging coil. The rechargeable battery is controlled by a battery management system. The CDOT device includes a variable resistance material to change its resistance in response to a change in current. The wireless charging coil forms a magnetic field in response to being proximate a second wireless charging coil which is external to the mobile device.

DETAILED DESCRIPTION

A novel circuit protection device, known as a CDOT device, short for Charge/Discharge Over Temperature, is disclosed for use in battery charging applications, such as mobile phones. The CDOT device includes electrodes having interdigitated fingers to form a tortuous, serpentine gap, upon which variable resistance material is deposited. The CDOT device is connected in series with a wireless charging coil inside the mobile phone and protects the wireless charging coil, the battery, and other components in the mobile phone from overtemperature, overcurrent, and overvoltage events, thus mitigating the possibility of thermal runaway in the battery.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1:
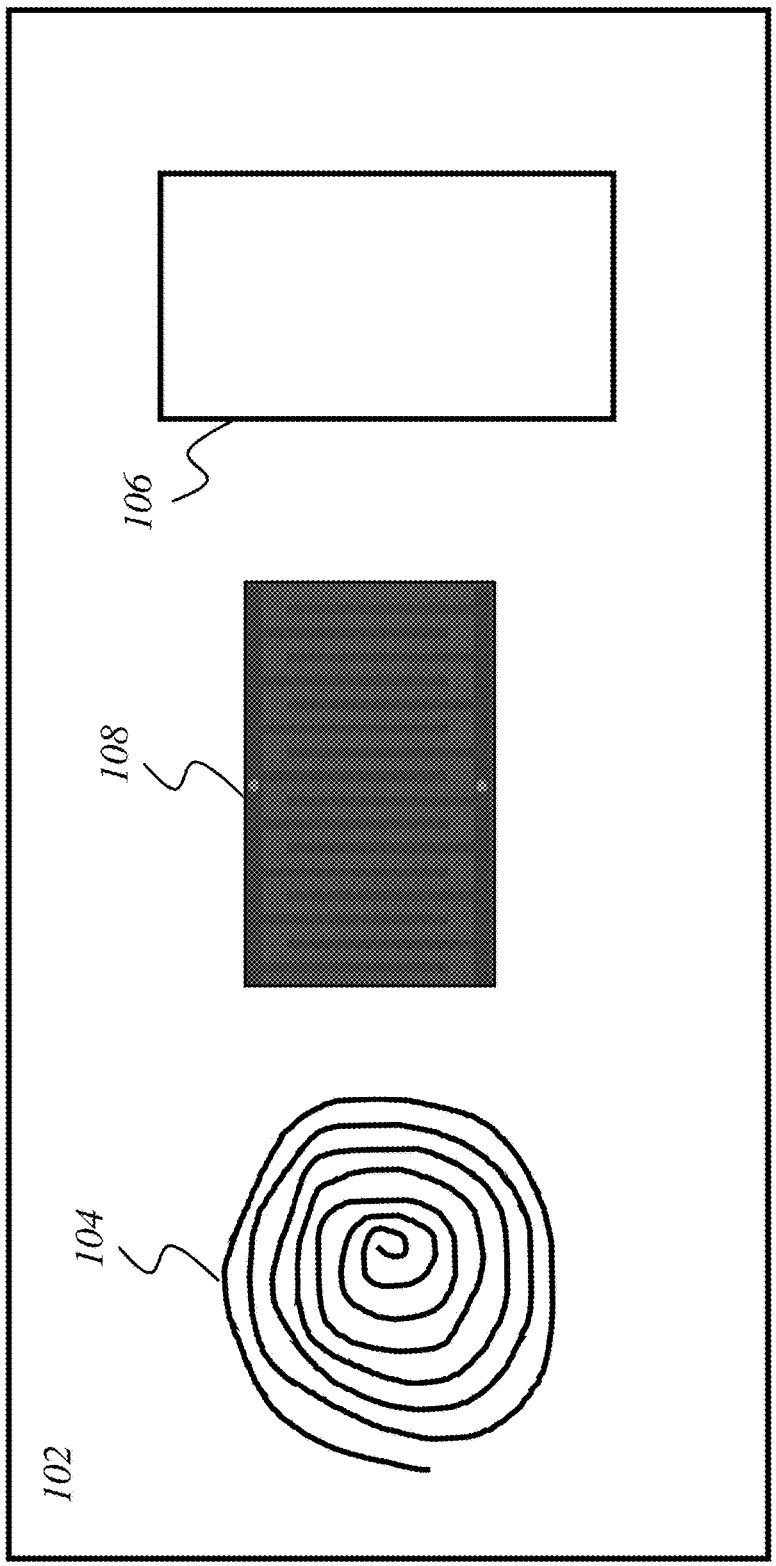
FIG. 1 is a diagram illustrating a wireless charging system, in accordance with exemplary embodiments.

FIG. 1 is a representative drawing of a wireless charging system 100, according to exemplary embodiments. The wireless charging system 100 features a mobile device 102 such as a smartphone, which houses a wireless charging coil 104 and a battery 106, with a Charge/Discharge Over Temperature (CDOT) device 108 disposed therebetween. The wireless charging coil 104 operates with a second wireless charging coil within an external charging device (not shown) to charge the battery 106. In exemplary embodiments, as shown in further detail below, the CDOT device 108 is connected to the wireless charging coil 104 to provide both temperature detection and overcurrent protection, thus mitigating the possibility of thermal runaway of the battery 106.

Figure 2A:
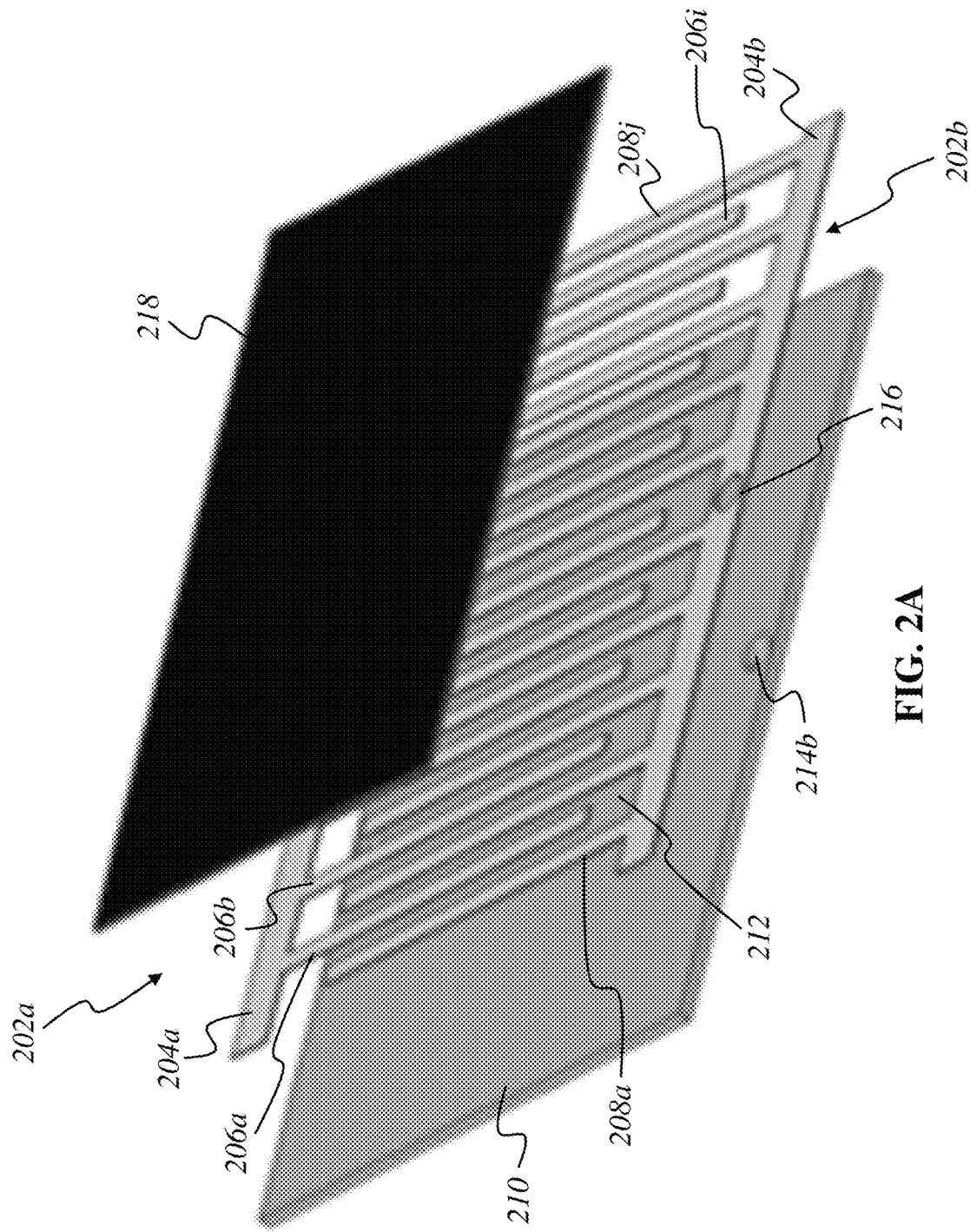
FIGS. 2A-2E are diagrams illustrating a Charge/Discharge Over Temperature (CDOT) device for use in the wireless charging system of FIG. 1, in accordance with exemplary embodiments.
Figure 2B:
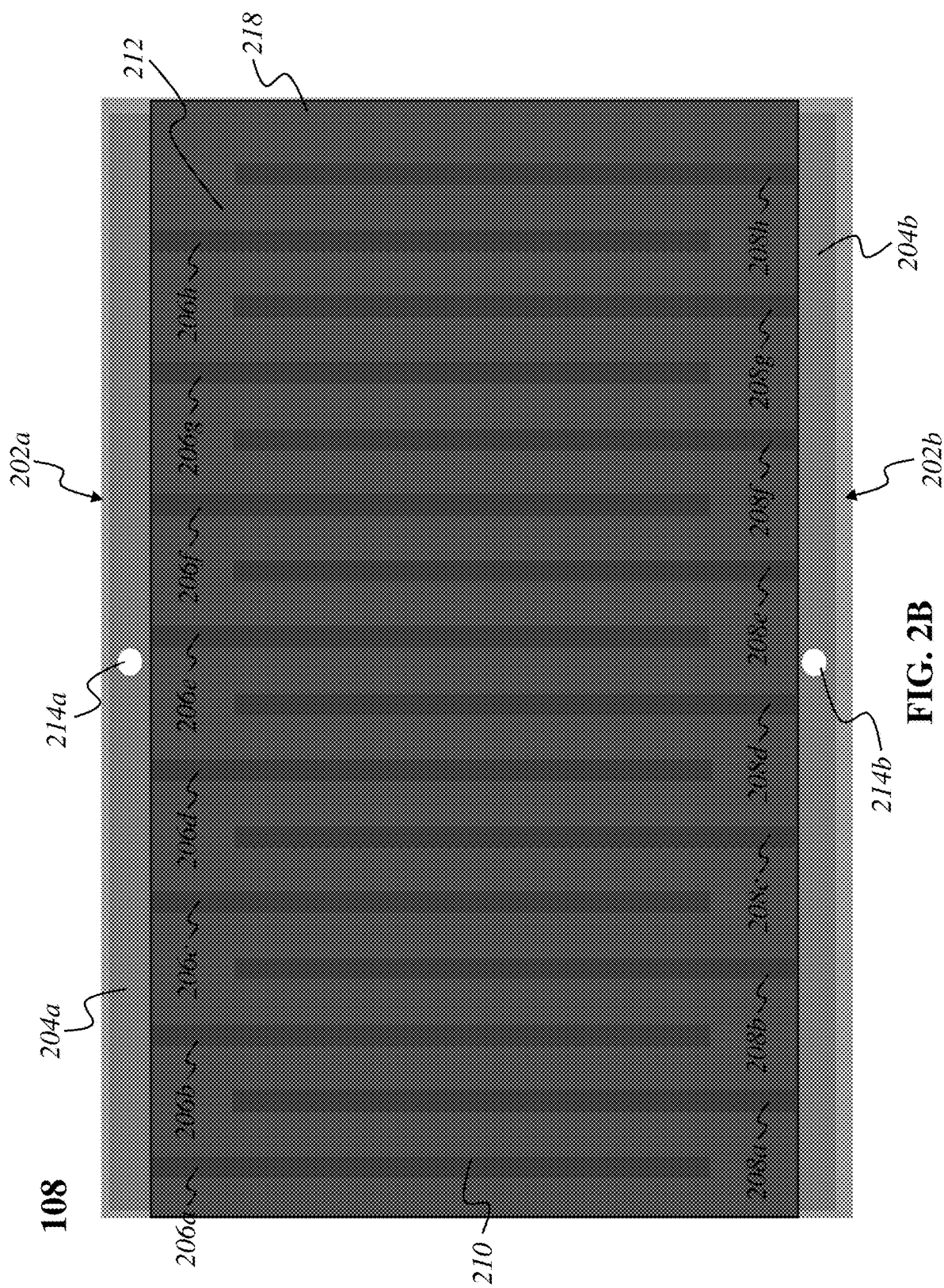
Figure 2C:
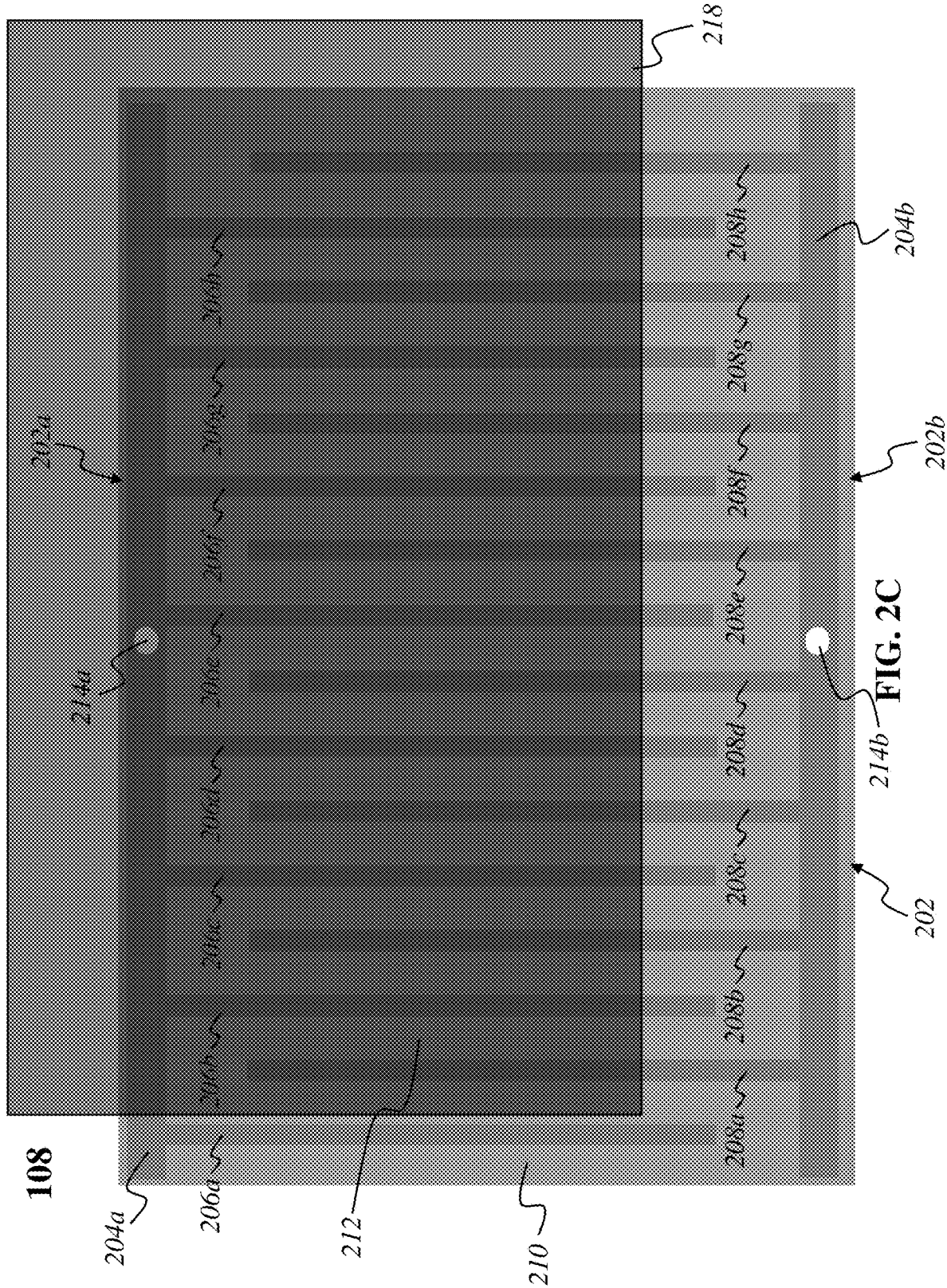

FIGS. 2A-2E are representative drawings of the CDOT device 108 of FIG. 1, according to exemplary embodiments. FIG. 2A is a perspective view of the CDOT device 108 while FIGS. 2B-2E are plan views of the CDOT device or portions thereof. The CDOT device 108 features a pair of conductors 202a and 202b (collectively, "conductor(s) 202") disposed between a substrate 210 and a variable resistance material 218. Each conductor 202 is made up of electrodes and fingers: conductor 202a includes electrode 204a and fingers 206a-i while conductor 202b includes electrode 204b and fingers 208a-j (collectively, "electrode(s) 204", "finger(s) 206", and "finger(s) 208"). The conductor 202a is electrically connected to the electrode 204a and the conductor 202b is electrically connected to the electrode 204b, with the electrodes 204 being disposed on the substrate 210 in a confronting arrangement.

In exemplary embodiments, the fingers 206 of the electrode 204a are disposed in an interdigitated, spaced-apart relationship with the fingers 208 of the electrode 204b, resulting in a serpentine, tortuous gap 212 therebetween. In FIG. 2A, conductor 202a includes nine fingers 206a-i and conductor 202b includes ten fingers 208a-j while In FIGS. 2B-2E, both conductors include eight fingers. In exemplary embodiments, the conductors 202 may have any number of fingers, as the illustrations are not meant to be limiting.

The electrodes 204 may be disposed on an intermediate substrate (e.g., a segment of FR-4 printed circuit board material), which may in turn be disposed on, and adhered to, the substrate 210. In exemplary embodiments, the substrate 210 is formed of a dielectric material that has an adhesive material on one or both sides, allowing the CDOT device 108 to be adhered to a surface, such for connection to the wireless charging coil 104 (FIG. 1). In various non-limiting embodiments, the substrate 210 may be Scotch Tape, polyvinyl chloride (PVC) tape, Mylar, and so on. In exemplary embodiments, the substrate 210 is a polyethylene terephthalate (PET). The conductors 202, which include the electrodes 204, the fingers 206, and the fingers 208, may be formed of elongated segments of flexible, electrically conductive material that may be adhered to, printed on, or otherwise applied to the substrate 210. Examples of materials to be used for the conductors 202 include, but are not limited to, copper mesh, silver epoxy, various types of metal wire or ribbon, conductive ink, and so on. In exemplary embodiments, the conductors 202 are made of a silver conductive ink.

In exemplary embodiments, the electrodes 204 are integral, contiguous portions of respective conductors 202. In exemplary embodiments, the conductors 202 and the electrodes 204 are formed of a flexible material. Confronting ends of the adjacent conductor 202a may be cut, printed, or otherwise formed to define the electrode 204a with interdigitated fingers 206. Similarly, confronting ends of the adjacent conductor 202b may be cut, printed, or otherwise formed to define the electrode 204b with interdigitated fingers 208. Electrode 204a is shown as being perpendicular to fingers 206 and electrode 204b is shown as being perpendicular to fingers 208. Alternatively, the fingers 206 and 208 may be otherwise arranged, such as diagonally from their respective electrodes 204, meandering in a curve-like configuration, or otherwise extending in a non-perpendicular manner distinct from what is shown in FIGS. 2A-2E, to form the tortuous, serpentine gap 212 therebetween, as the illustration is not meant to be limiting.

The variable resistance material 218 is indicated as dark sheet disposed upon the electrodes 204, the fingers 206, and the fingers 208. The variable resistance material 218 is shown as partially transparent in FIGS. 2B and 2C and is moved in FIG. 2C to reveal the underlying components in the plan view. The variable resistance material 218 is generally opaque but is shown as "transparent" so that the other features of the CDOT device 108 are visible. In exemplary embodiments, the variable resistance material 218 and the conductors 202 form a temperature sensing element that also provides overcurrent protection.

In exemplary embodiments, the variable resistance material 218 is disposed on the fingers 206 and 208 to bridge and/or fill the gap 212, which also results in the fingers 206 being connected to the fingers 208. In exemplary embodiments, the fingers 206 and 208 are spaced a predetermined distance apart to accommodate the prevention of polymer breakdown in the variable resistance material under a high electric field. Additionally, care is ensured that the fingers 206 and 208 not exhibit ferro- or antiferro-magnetic properties. In exemplary embodiments, the fingers 206 and 208 are made using copper, high conductivity carbon-based materials, such as carbon nanotube, pyrolyzed carbon, graphite, and/or combinations of these materials. This ensures that the CDOT device 108 does not block, even partially, the transfer of energy to the wireless receiver, that is, the charging coil of the mobile device 102 (FIG. 1). The charging coil of the charging device (see FIG. 7, below) may be referred to as the primary coil while the charging coil of the mobile device is known as the secondary coil.

Figure 2D:
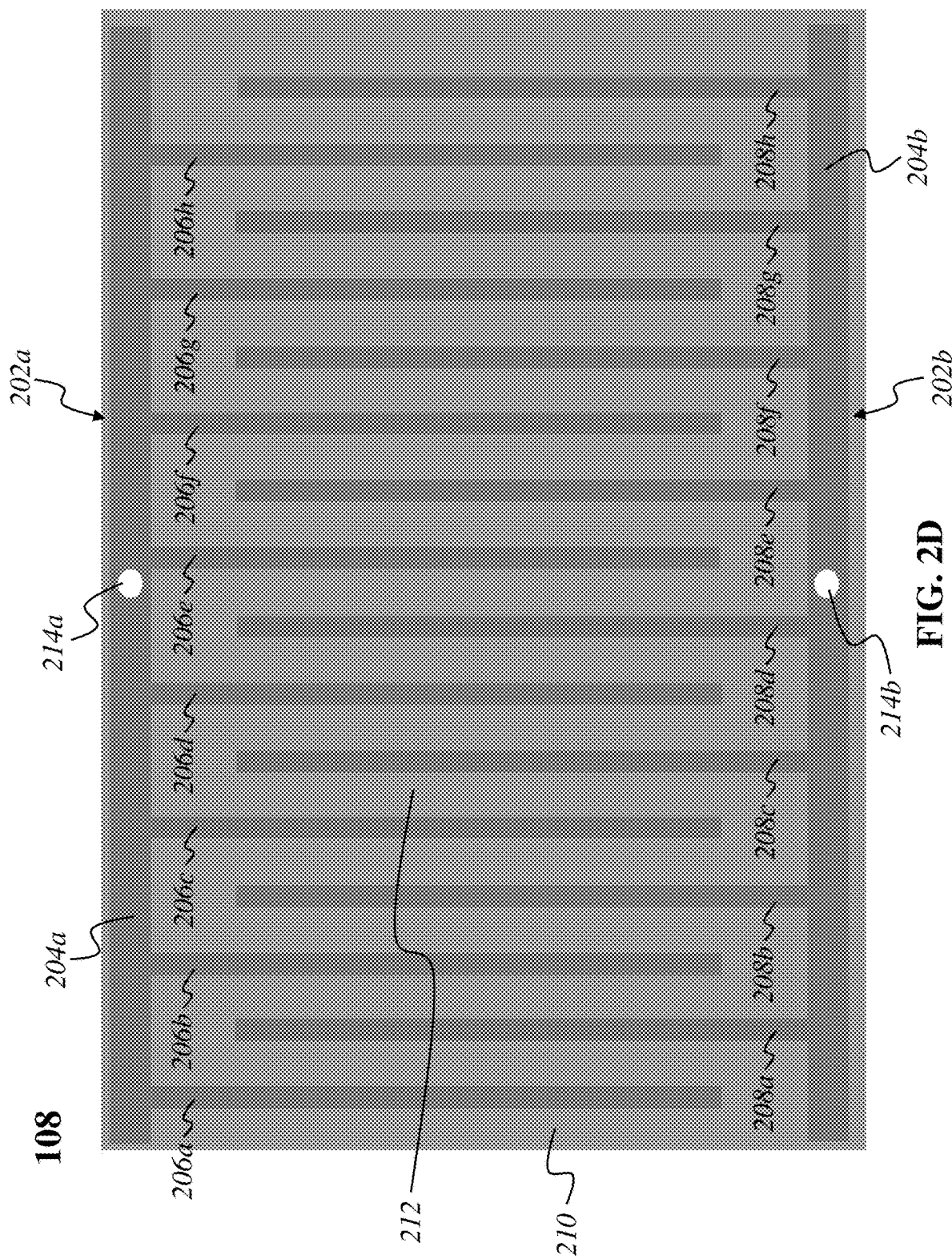
Figure 2E:
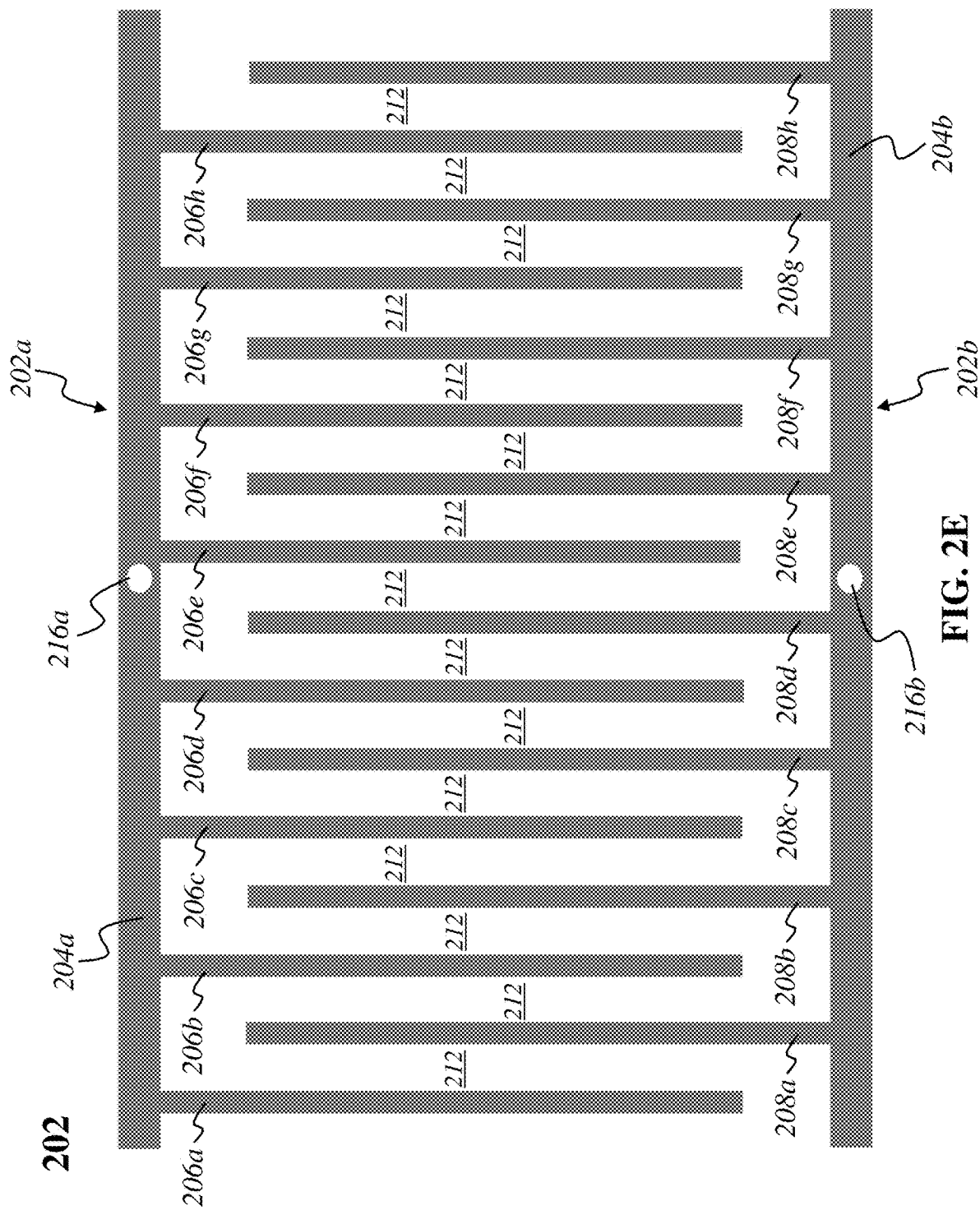

In FIG. 2D, the conductors 202 and the substrate 210 are shown, with the variable resistance material 218 removed; in FIG. 2E, only the conductors 202 are shown. The gap 212 is called out in various places in FIGS. 2A-2E but is essentially occupies the entire "white space" within the rectangular structure of FIG. 2E. Looking particularly at FIGS. 2D and 2E, the fingers 206 and 208 alternate with one another and with the gap 212, with finger 206a being adjacent to a portion of the gap, which is adjacent to finger 208a, which is adjacent to another portion of the gap, which is adjacent to finger 206b, which is adjacent to another portion of the gap, which is adjacent to finger 208c, which is adjacent to another portion of the gap, and so on. In exemplary embodiments, the variable resistance material 218 is a polymeric positive temperature coefficient (PPTC) ink material that is disposed atop these alternating fingers and gaps, which fills into and occupies the regions of both the fingers and the gap within the interdigitated structure.

Figure 3B:
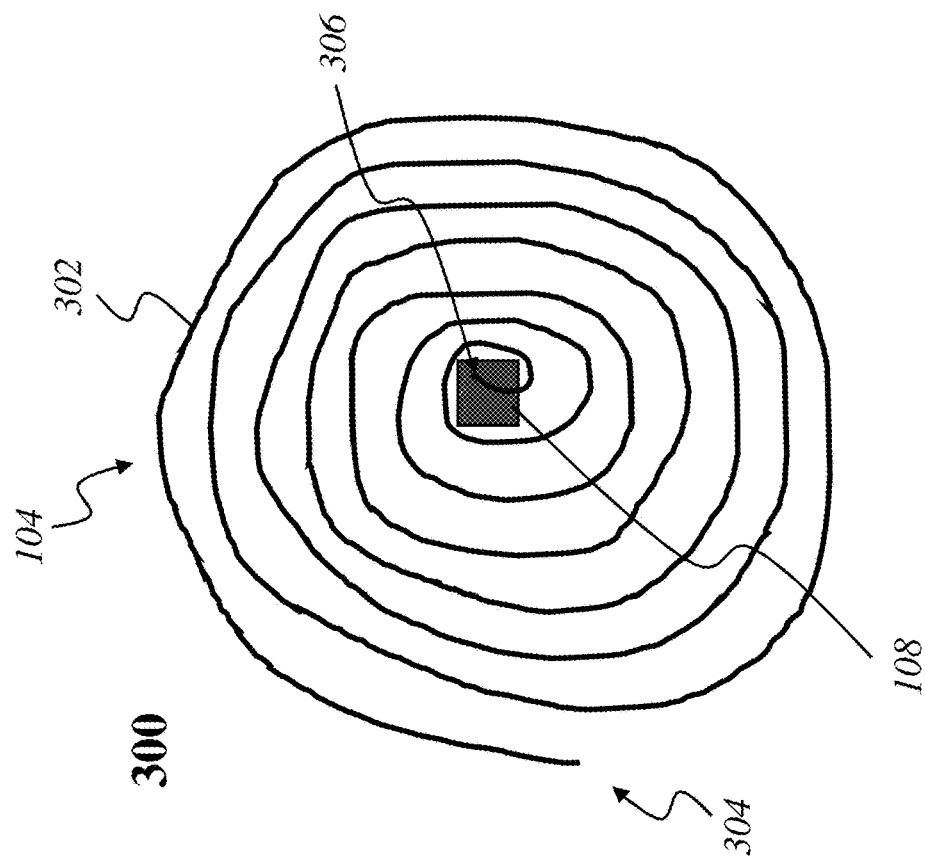
FIGS. 3A-3C are coupling apparati for the wireless charging system of FIG. 1, in accordance with exemplary embodiments.
Figure 3A:
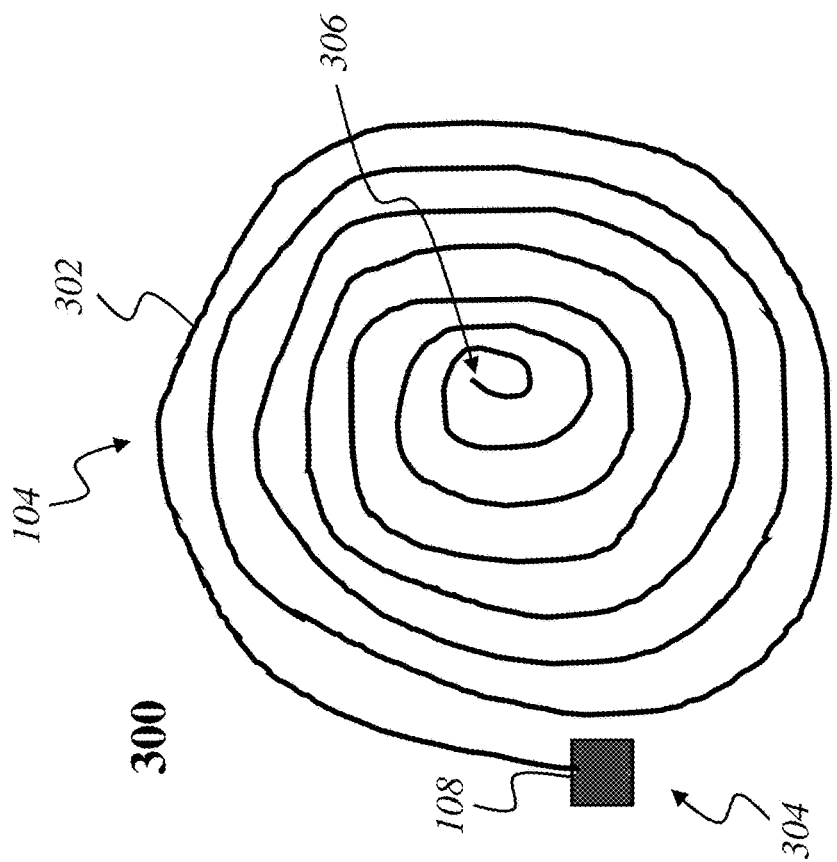
Figure 3C:
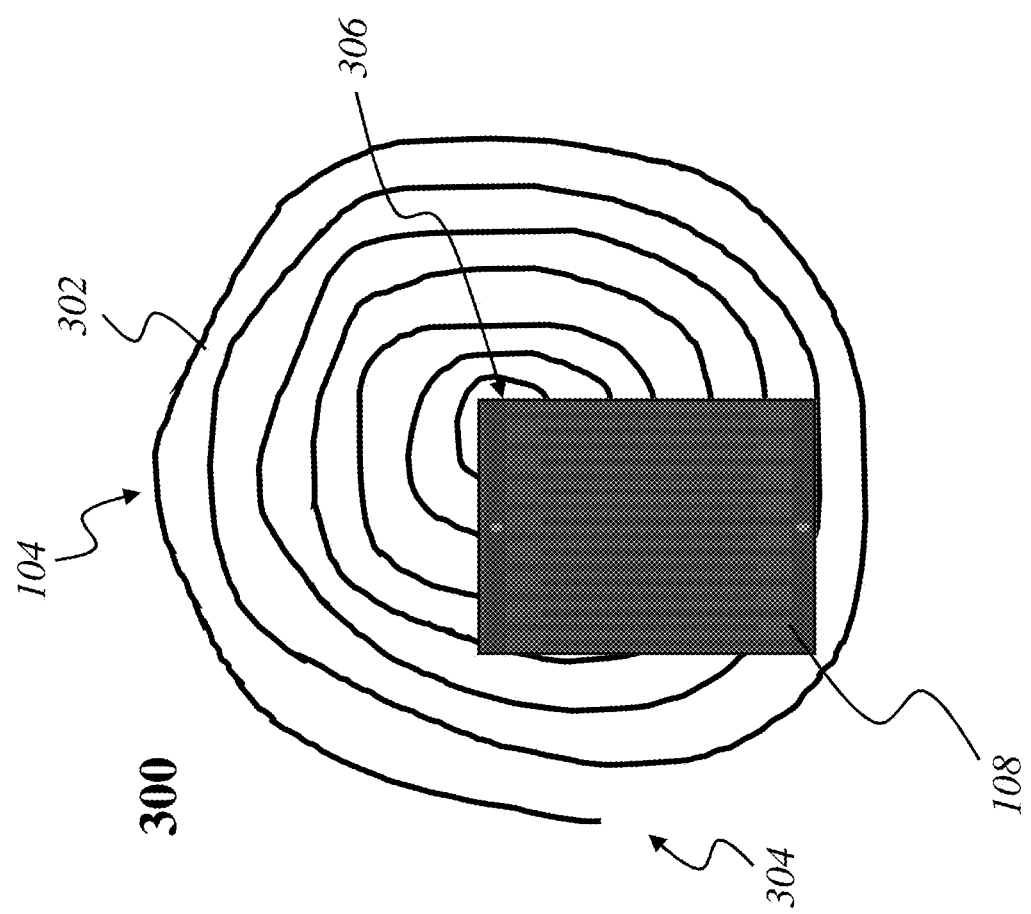

Apertures 214a and 214b (collectively, "aperture(s) 214") are formed in the substrate 210 while apertures 216a and 216b (collectively, "aperture(s) 216") are formed in the conductors 202. In exemplary embodiments, the apertures 214 and 216 enable alignment of the elements of the CDOT device 108 prior to assembly. The apertures 214 and 216 may also allow the CDOT device 108 to be secured to the wireless charging coil 104, as illustrated in FIGS. 3A-3C, below.

In various embodiments, the PPTC material that makes up the variable resistance material 218 of the CDOT device 108 has an electrical resistance that increases sharply when the variable resistance material reaches a predefined temperature, known as the "PPTC activation temperature". In other embodiments, the variable resistance material 218 is a polymeric negative temperature coefficient (PNTC) material having an electrical resistance that decreases sharply when the variable resistance material reaches a predefined temperature, known as the "PNTC activation temperature". In a specific, non-limiting embodiment, the variable resistance material 218 is a PPTC material formed of conductive particles (e.g., conductive ceramic particle) suspended in a polymer resin. In exemplary embodiments, the variable resistance material 218 is applied to the fingers 206 and 208 as a fluidic ink or as a compound that may be subsequently cured to form a solid mass that partially covers and/or envelopes the fingers.

In exemplary embodiments, the variable resistance material 218 consists of one or more crystalline or semicrystalline polymers with a melting temperature preferably below 70° C., polyurethanes, polyesters, various copolymers of ethylene butyl acetate (EBA), and/or low molecular weight polyethylenes. Where the wireless charging system 100 features a high-temperature battery, the variable resistance material 218 consists of polyvinylidene fluoride or polyvinylidene difluoride (PVDF), in some embodiments. Where the wireless charging coil 104 may be exposed to high temperatures, the conductive part of the variable resistance material 218 consists preferably of carbon-based particles such as carbon black, carbon nanotubes, and so on, in exemplary embodiments.

The PPTC activation temperature may be different from the PNTC activation temperature. In exemplary embodiments, the PPTC/PNTC material of the variable resistance material 218 is carefully chosen to ensure that the PPTC/PNTC activation temperature is within a certain temperature range. Thus, the variable resistance material 218 may be crafted for a specific application in which the PPTC/PNTC activation temperature protects the circuit of the application.

In exemplary embodiments, the CDOT device 108 is connected in electrical series between the wireless charging coil 104 and the battery 106 to provide both temperature sensing and overcurrent protection. As one example, the conductor 202a would be connected to the wireless charging coil 104 and the conductor 202b would be connected to the battery 106, thus forming an in-series connection between the two devices.

In some embodiments, the CDOT device 108 is formed of a thin, flexible material. In other embodiments, the CDOT device 108 is formed of a not thin, rigid material. In exemplary embodiments, the CDOT device 108 is made of a material that is transparent to the magnetic field formed by the wireless charging coil 104 once paired with a similar charging coil disposed within a battery charger. In one embodiment, the CDOT device 108 is made using diamagnetic material. Materials are said to be diamagnetic if the electrons within the material are paired and thus there are no free electrons within the material. Wood, copper, gold, bismuth, mercury, silver, lead, neon, water, and superconductors are diamagnetic, for example. In exemplary embodiments, the CDOT device 108 is made using one or more of the following combinations of materials: carbon black, polymers, copper fingers, and diamagnetic ceramic. In exemplary embodiments, the CDOT device 108 is made using diamagnetic materials that expel magnetic field lines. Further, in exemplary embodiments, conductive particles in the dielectric matrix of the CDOT device 108 are selected to minimize eddy currents.

In some embodiments, the CDOT device 108 is flexible to accommodate the geometry of its application. In exemplary embodiments, the CDOT device 108 features holes or perforations disposed particularly to concentrate magnetic fields and/or steer the magnetic fields in a particular direction. Perforations could be real or virtual by masking parts of the variable resistance material 218 of the CDOT device 108 with magnetic materials.

Additionally, in some embodiments, the CDOT device 108 can be enhanced using flexible metal oxide varistor (MOV) type circuitry to accommodate overvoltage due to field interference lines or changed angles from the magnetic field produced during battery charging, where the ferric shield concentrator could be saturated. The ferric shield concentrator is a ferroelectric material that confines the magnetic field to the vicinity of a receiver antenna.

FIGS. 3A-3C are representative drawings of a coupling apparatus 300, according to exemplary embodiments. FIG. 3A shows a first configuration; FIG. 3B shows a second configuration, and FIG. 3C shows a third configuration of the coupling apparatus 300. The coupling apparatus 300 consists of the wireless charging coil 104 and the CDOT device 108 of the mobile device 102 from FIG. 1. The wireless charging coil 104 is a typically tightly wound piece of electrically conductive wire 302, such as copper. Together with a similar coil on a charging device, the wireless charging coil 104 form a transformer that causes a magnetic field having a magnetic flux. The wireless charging coil 104 is thus a magnet/ferrite concentrator/shield. The resulting magnetic flux density is based on characteristics such as the number of turns of the wire 302, the diameter of the electrically conductive wire, the material used for the wire, the distance between the coils, and the current. The wireless charging coil 104 thus consists of the electrically conductive wire 302 having two end points 304 and 306.

The CDOT device 108 may be connected to either end of the conductive wire 302. In FIG. 3A, the CDOT device 108 is connected to the end point 304, with either the conductor 202a or the conductor 202b of the CDOT device 108 (FIGS. 2A-2E) being connected to the conductive wire 302. In FIG. 3B, the CDOT device 108 is connected to the end point 306. Either end point connection, 304 or 306, establishes an in-series connection between the wireless charging coil 104 and the CDOT device 108. In FIGS. 3A and 3B, the CDOT device 108 is insignificant in size relative to the charging coil. However, the configuration of FIG. 3C shows that, whether connected at the end point 304 or the end point 306, the CDOT device 108 can partially or fully cover the wireless charging coil 104, in exemplary embodiments. Once connected to one of the end points 304 or 306, the CDOT device 108 can assume a variety of different positions relative to the wireless charging coil 104.

When the wireless charging coil 104 is paired with a similar wireless charging coil of a battery charger, the two wireless charging coils operate as a transformer, creating a magnetic field which enables the battery to be charged. Sometimes, the magnetic field saturation gets high enough that the wireless charging coil 104 gets overheated. Left unmanaged, the overheating can result in thermal runaway within the mobile device 102, which can destroy both the battery 106 and the mobile device. In exemplary embodiments, the CDOT device 108 disposed in series with the wireless charging coil 104 provides current limiting and voltage limiting, thus preventing this overheating.

Further, the nature of wireless charging can cause conditions that are unmanageable. When the magnetic field supplied is constant or the magnetic field lines are set by simple geometry, it is possible to design a part that will fit into a rigid design. However, if magnetic field lines can be changed simply due to a change in device placement, which can occur with wireless charging, virtual loops can result, which can cause unintended behavior, such as overheating. The presence of the CDOT device 108 in series with the wireless charging coil 104 provides a mechanism to limit current and/or voltage, as needed, to prevent unintended behavior during the wireless charging event.

Further, in exemplary embodiments, the conductors 202 of the CDOT device 108 are designed to not exhibit ferro- or antiferro-magnetic properties. Ferromagnetism is the susceptibility to magnetism while antiferromagnetism occurs when the magnetic moments of atoms or molecules within a material, which is related to the spin of electrons, align in a regular pattern with neighboring spins pointing in opposite directions. Both ferromagnetism and antiferromagnetism would prevent the transfer of energy during the wireless charging event.

There are other failure conditions that might arise with the mobile device 102 that are addressed by the CDOT device 108, in exemplary embodiments. Mobile devices generally include transient voltage suppressors (TVS) to protect against overvoltage events. Nevertheless, a transient of ≤100 Vpk can still heat up the mobile device. The presence of the transient throughout the failure condition can also result in unintended heat. During the charging event, current in the wireless charging coil 104 can increase, which also increases the heat to the mobile device. Other events, like leaving the mobile device in a hot car, can result in device failure. Including the CDOT device 108 with the wireless charging coil 104 addresses one or more of these failure conditions, in exemplary embodiments.

Figure 4:
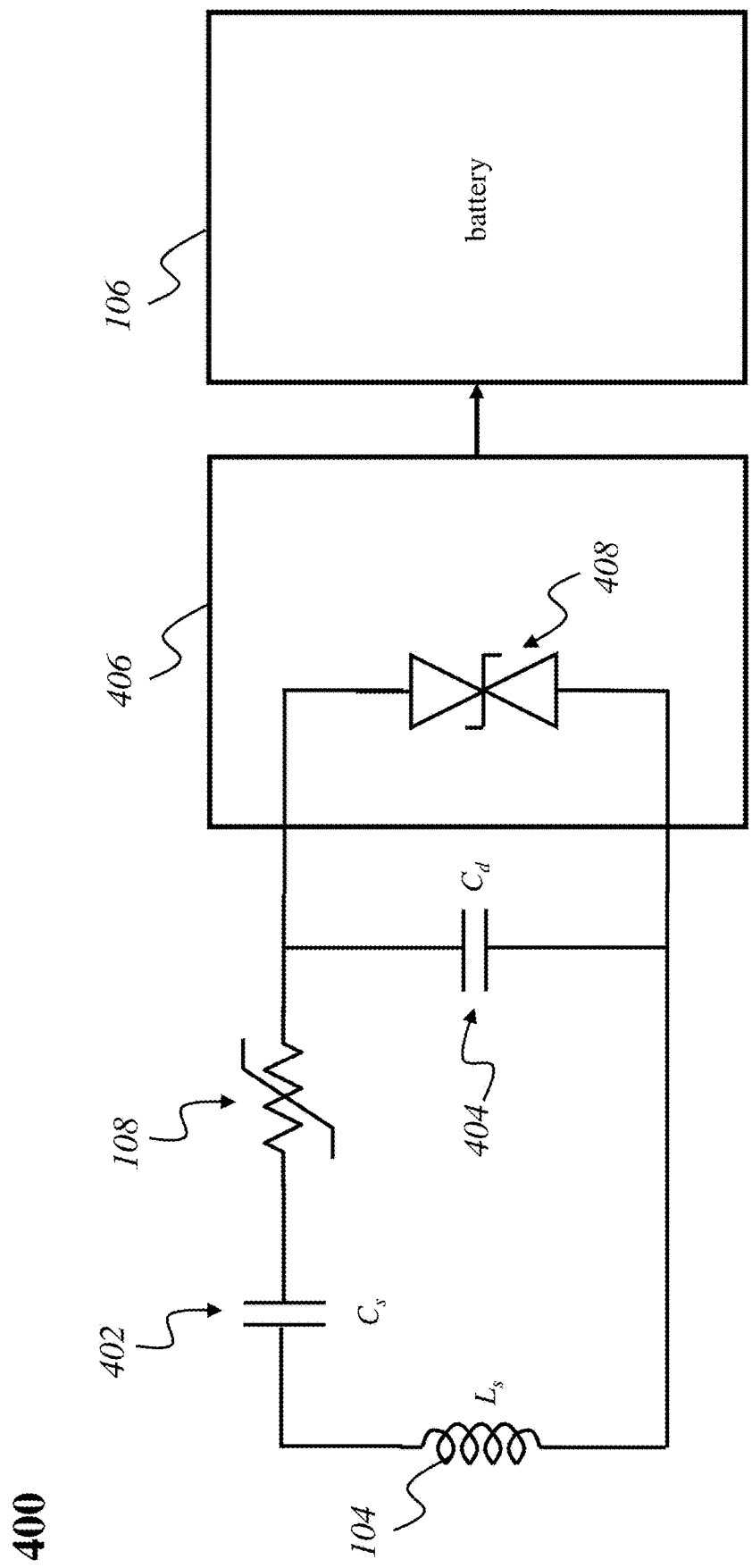
FIG. 4 is a circuit representation of the wireless charging system of FIG. 1, in accordance with exemplary embodiments.

FIG. 4 is a representative diagram of a circuit 400 used to illustrate the relationship between the components of FIG. 1, according to exemplary embodiments. The wireless charging coil 104 (shown as an inductor $L_s$), the CDOT device 108 (shown as a variable resistor), and the battery 106 are included in the circuit 400. The circuit 400 also includes two capacitors 402 (Cs) and 404 (Cd) and a TVS diode 408 disposed within a battery management system 406. In exemplary embodiments, the battery management system 406 is an integrated circuit consisting of a rectifier and buck stage and includes the TVS diode 408. Like the CDOT device 108, the TVS diode 408 also protects the battery 106 from high-voltage transients.

Recall from FIGS. 3A and 3B that the CDOT device 108 is connected at one end to the wireless charging coil 104. In exemplary embodiments, the other end of the CDOT device 108 is connected to both the capacitor 404 as well as the battery management system 406, specifically, the TVS diode 408. In exemplary embodiments, the circuit 400, including the CDOT device 108, does not significantly alter the inductance of the wireless charging coil 104 and thus does not significantly change the resonance frequency.

Figure 5B:
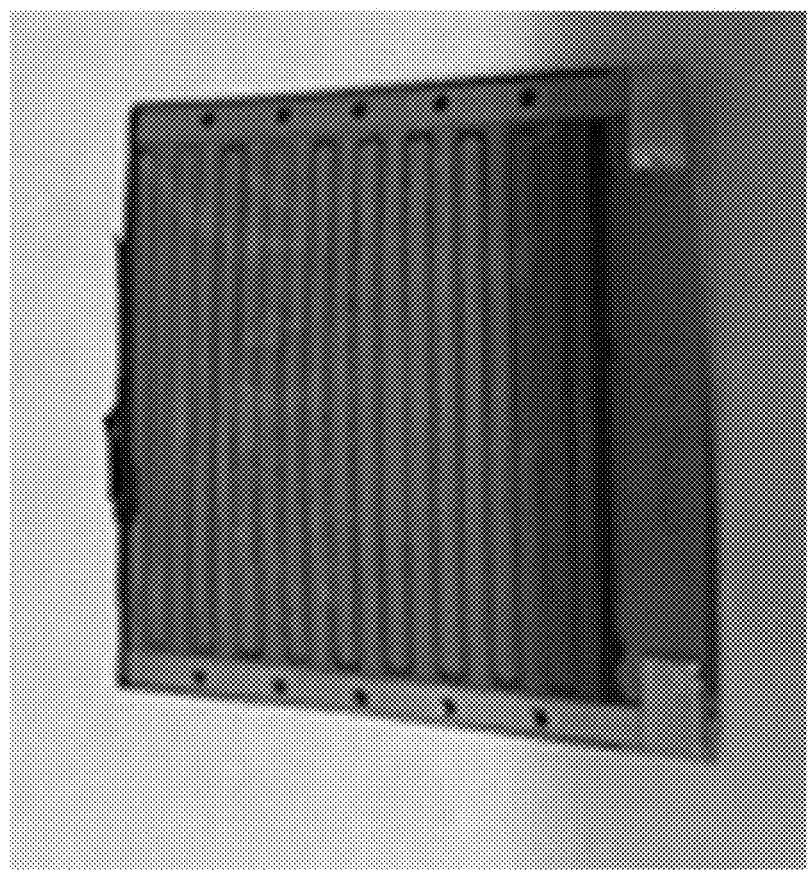
FIGS. 5A and 5B are photographs of the CDOT device, in accordance with exemplary embodiments.
Figure 5A:
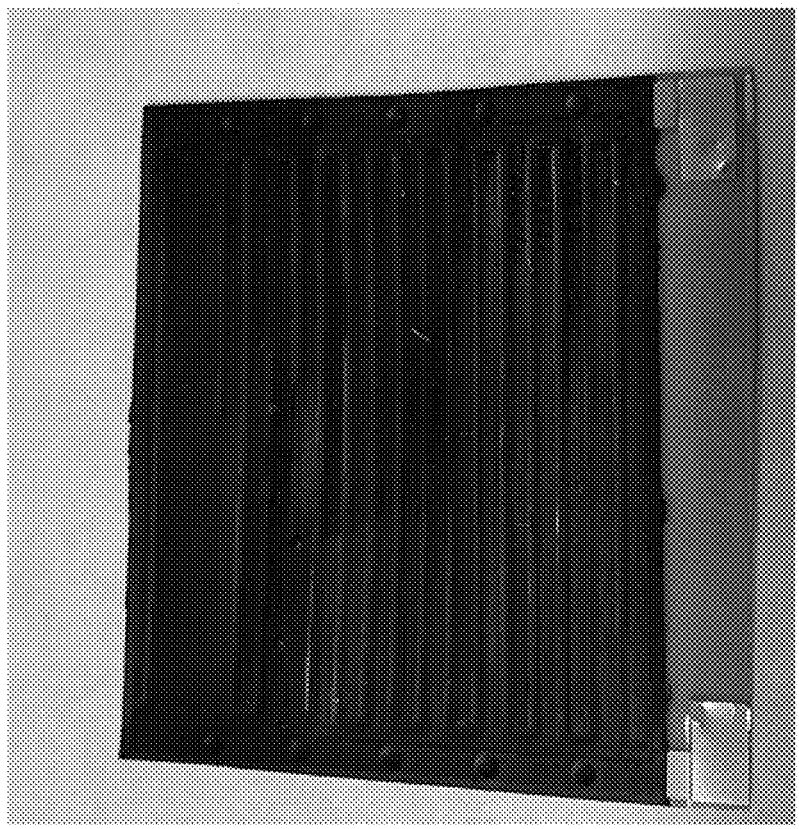

FIGS. 5A and 5B are representative drawings of the CDOT device 108, according to exemplary embodiments. FIG. 5A is a top view and FIG. 5B is a bottom view of the CDOT device 108. In exemplary embodiments, the CDOT device 108 is rectangular in shape, but can also be formed as a circle, an oval, a triangle, any other polygon-shape, or may be amorphous in shape. The CDOT device 108 may be custom-shaped to fit the environment in which it is to be used, for example. In the illustrations of FIGS. 5A and 5B, the CDOT device is 355 mm×35 mm, 300 to 500 μm thick, with a voltage rating of 60 Vdc, a trip temperature of 60° C., a hold current of 400 mA (@ 25° C.), and a trip current of 450 mA (@ 25° C.). The variable resistance material, the number, shape, and size of the fingers, and other CDOT device components can be adjusted to fit the characteristics of the environment in which the CDOT device is to be used.

Figure 6:
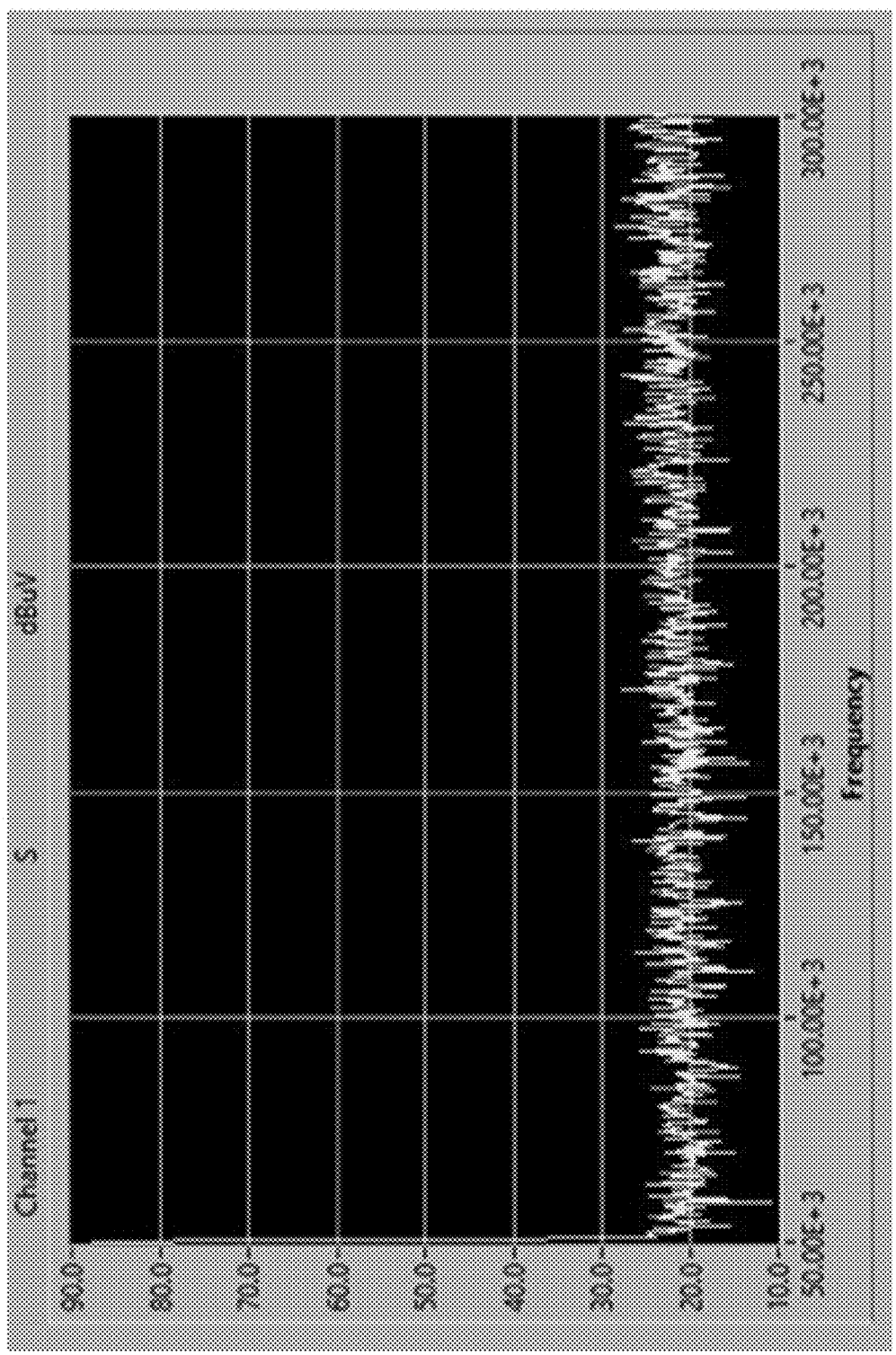
FIG. 6 is a graph showing the effects of the CDOT device on the magnetic field, in accordance with exemplary embodiments.

FIG. 6 is a graph 600 showing the magnetic field in the presence of the CDOT device 108, according to exemplary embodiments. The graph 600 shows that the magnetic field generated by the wireless charging coil 104 paired with a similar wireless charging coil in a battery charging device is not affected by the presence of the CDOT device 108, in exemplary embodiments. The graph 600 shows that, between 50 kHz and 300 kHZ, there is no change in the magnetic field generated by the wireless charging pair.

Figure 7:
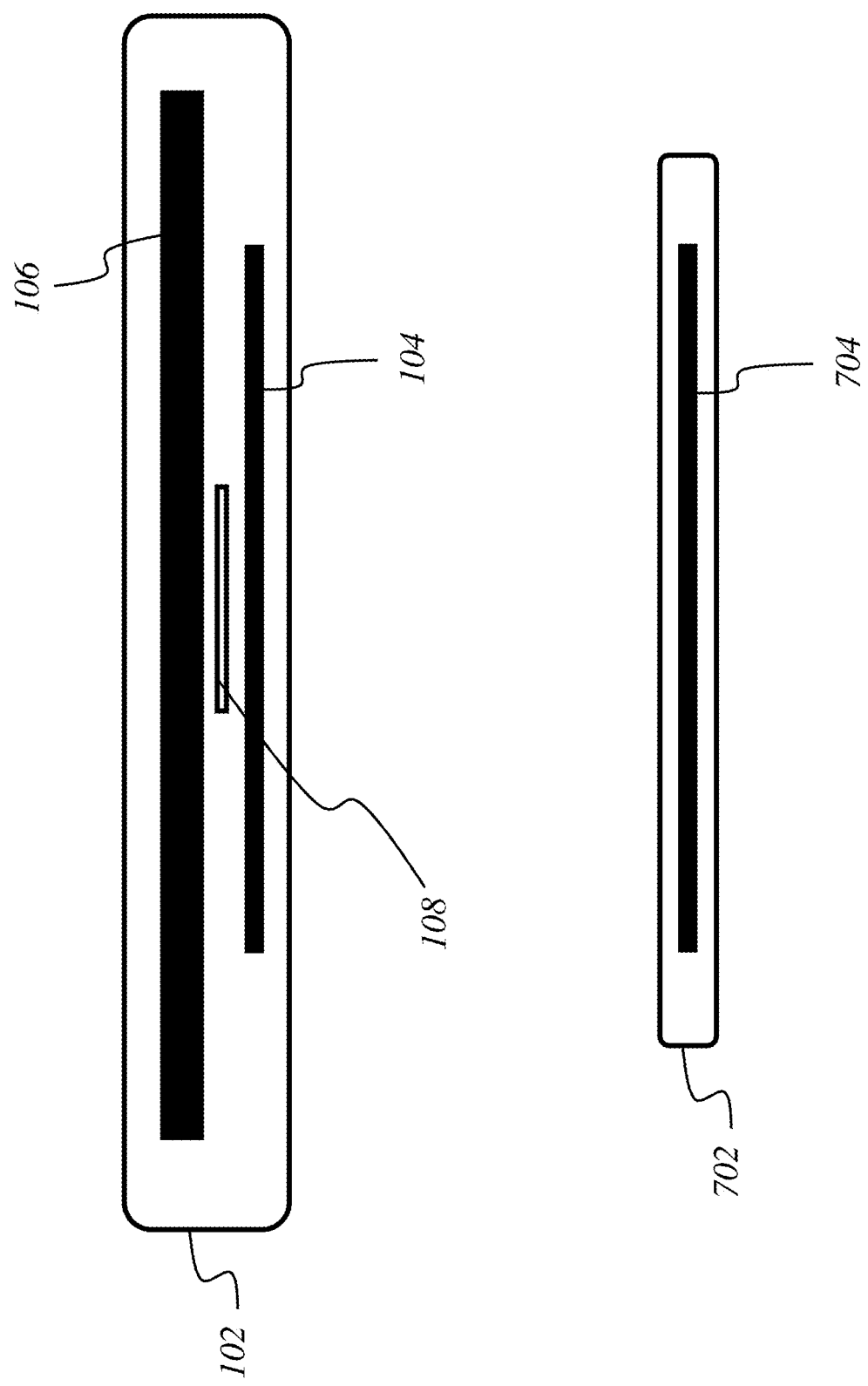
FIG. 7 is a diagram illustrating a mobile device in the presence of a wireless battery charger, in accordance with exemplary embodiments.

FIG. 7 is a representative drawing of the mobile device paired with a wireless charging device, according to exemplary embodiments. The mobile device 102 from FIG. 1 is shown, including the wireless charging coil 104, the battery 106, and the CDOT device 108, with the CDOT device being disposed between the battery and the wireless charging coil. A wireless charging device 702 is also shown, which has its own wireless charging coil 704. When the mobile device 102 is placed in proximity to the wireless charging device 702 the wireless charging coil 104 and the wireless charging coil 704 operate like a transformer and generate a magnetic field. This magnetic field is used to charge the battery 106. In exemplary embodiments, the CDOT device 108 connected in series with the wireless charging coil 704 automatically increases its resistivity in response to an increase in temperature, which slows down the charging operation of the wireless charging device 702. Further, in exemplary embodiments, the CDOT device 108 automatically increases its resistivity in response to an overcurrent or overvoltage condition, which also slows down the charging operation of the wireless charging device 702. Once the failure conditions cease, the resistivity of the CDOT device 108 is decreased, allowing the wireless charging device 702 to resume full charging of the battery 106.

The CDOT device 108 is thus a PTC or NTC device that increases its resistivity in response to increased temperature, increased current flow, or increased voltage, which protects the mobile device 102 from undesired heating, which also mitigates the possibility of thermal runaway in the battery 106. In addition to mobile devices, the CDOT device 108 may also be used in industrial chargers or transformers, in some embodiments.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A battery protection device comprising:
   a Charge/Discharge Over Temperature (CDOT) device comprising:
   a first electrode disposed on a substrate, the first electrode comprising a first plurality of fingers;
   a second electrode disposed on the substrate, the second electrode comprising a second plurality of fingers, wherein the first plurality of fingers are disposed in an interdigitated, spaced-apart relationship with the second plurality of fingers, resulting in a serpentine, tortuous gap therebetween; and
   a variable resistance material to change resistance in response to a change in temperature; and
   a wireless charging coil coupled to the CDOT device;
   wherein the first plurality of fingers and the second plurality of fingers are spaced a predetermined distance apart and the CDOT device does not have ferromagnetic properties and does not have antiferromagnetic properties.

2. The battery protection device of claim 1, wherein the wireless charging coil and a second wireless charging coil form a magnetic field.

3. The battery protection device of claim 2, wherein the CDOT device does not change the magnetic field.

4. The battery protection device of claim 1, wherein the variable resistance material is a polymeric positive temperature coefficient material.

5. The battery protection device of claim 1, wherein the variable resistance material is a polymeric negative temperature coefficient material.

6. The battery protection device of claim 1, wherein the variable resistance material is made using a diamagnetic material.

7. The battery protection device of claim 1, wherein the variable resistance material is disposed over the first electrode, the first plurality of fingers, the second electrode, and the second plurality of fingers.

8. The battery protection device of claim 1, wherein the CDOT device is disposed in between a battery and the wireless charging coil in a mobile device.

* * * * *